United States Patent [19]

Clark et al.

[11] Patent Number: 4,579,062
[45] Date of Patent: Apr. 1, 1986

[54] AUTOMATIC LATCHING ASSEMBLY FOR CAR BODY CARRIERS

[75] Inventors: Robert B. Clark, Overland Park, Kans.; Erik M. Andersen, Parkville, Mo.

[73] Assignee: Mid-West Conveyor Company, Inc., Kansas City, Kans.

[21] Appl. No.: 685,469

[22] Filed: Dec. 24, 1984

[51] Int. Cl.$^4$ ............................................. B61B 10/02
[52] U.S. Cl. ..................................... 104/89; 105/148; 410/77; 118/423; 118/503; 198/803.9
[58] Field of Search ................................. 105/148-150, 105/154, 155, 268; 104/89, 93-95, 172 S, 172 B; 410/43, 77, 84, 52, 69, 70; 118/423, 503; 134/45, 123; 198/342, 678, 696

[56] References Cited

U.S. PATENT DOCUMENTS

| | | | |
|---|---|---|---|
| 2,658,008 | 11/1953 | Williams et al. | 118/423 |
| 3,249,064 | 5/1966 | Barry | 104/89 |
| 3,318,435 | 5/1967 | Scott | 198/678 |
| 3,995,561 | 12/1976 | Allor, Jr. | 104/172 S |
| 4,341,161 | 7/1982 | Morita et al. | 105/149 |
| 4,408,539 | 10/1983 | Wakabayashi | 104/89 |
| 4,464,998 | 8/1984 | Wakabayashi | 105/148 |
| 4,475,462 | 10/1984 | Tsumaki et al. | 105/149 |
| 4,483,252 | 11/1984 | Pierson | 104/172 B |

FOREIGN PATENT DOCUMENTS

| | | | |
|---|---|---|---|
| 0029058 | 8/1982 | Japan | 118/423 |
| 1395383 | 5/1975 | United Kingdom | 118/423 |
| 1063487 | 12/1983 | U.S.S.R. | 134/123 |

OTHER PUBLICATIONS

Non-Patent Reference 1 Latch Bolt is Attached Reference.

Primary Examiner—Robert B. Reeves
Assistant Examiner—Dennis C. Rodgers
Attorney, Agent, or Firm—Litman, Day and McMahon

[57] ABSTRACT

An automatic latching assembly is provided for retaining vehicle bodies upon conveyor carriers during conveyance into and out of treatment baths. The assembly includes a carrier having latches mounted thereon which selectively engage the vehicle body securing it to the carrier. The latches comprise pivoting hooks rotatably mounted upon the carrier. Generally, gravity actuates pivoting of the hooks, biasing them into latching orientations. Unlatching orientations are achieved by a stationary, upward biasing cam operating upon the hooks. A downward biasing cam aids in the gravity actutation of the hooks into the latching orientation. The assembly selectively, automatically secures the vehicle body to the conveyor carrier, or releases it therefrom, as desired during transport of the vehicle body by the conveyor.

7 Claims, 7 Drawing Figures

U.S. Patent Apr. 1, 1986 Sheet 1 of 2 4,579,062
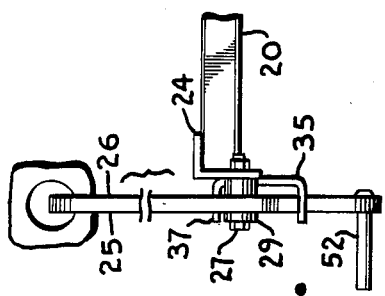
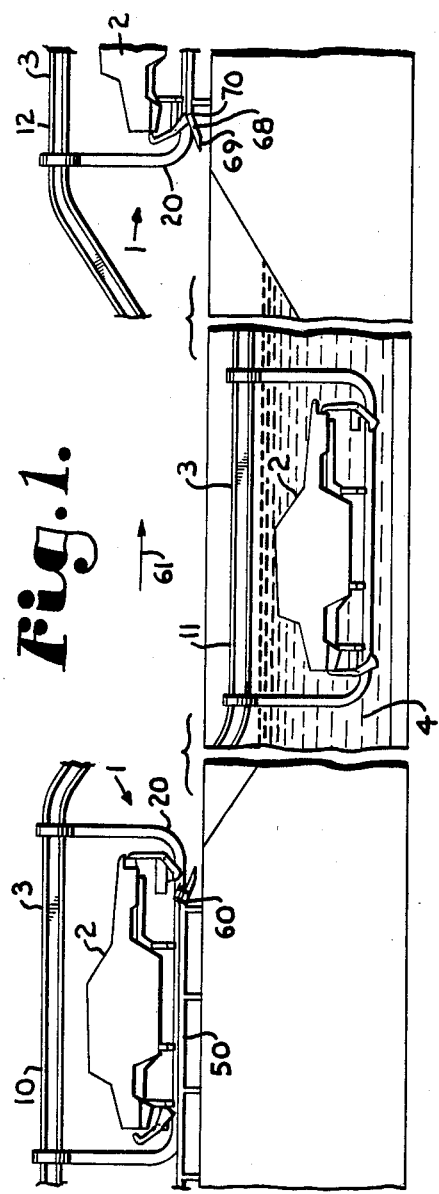
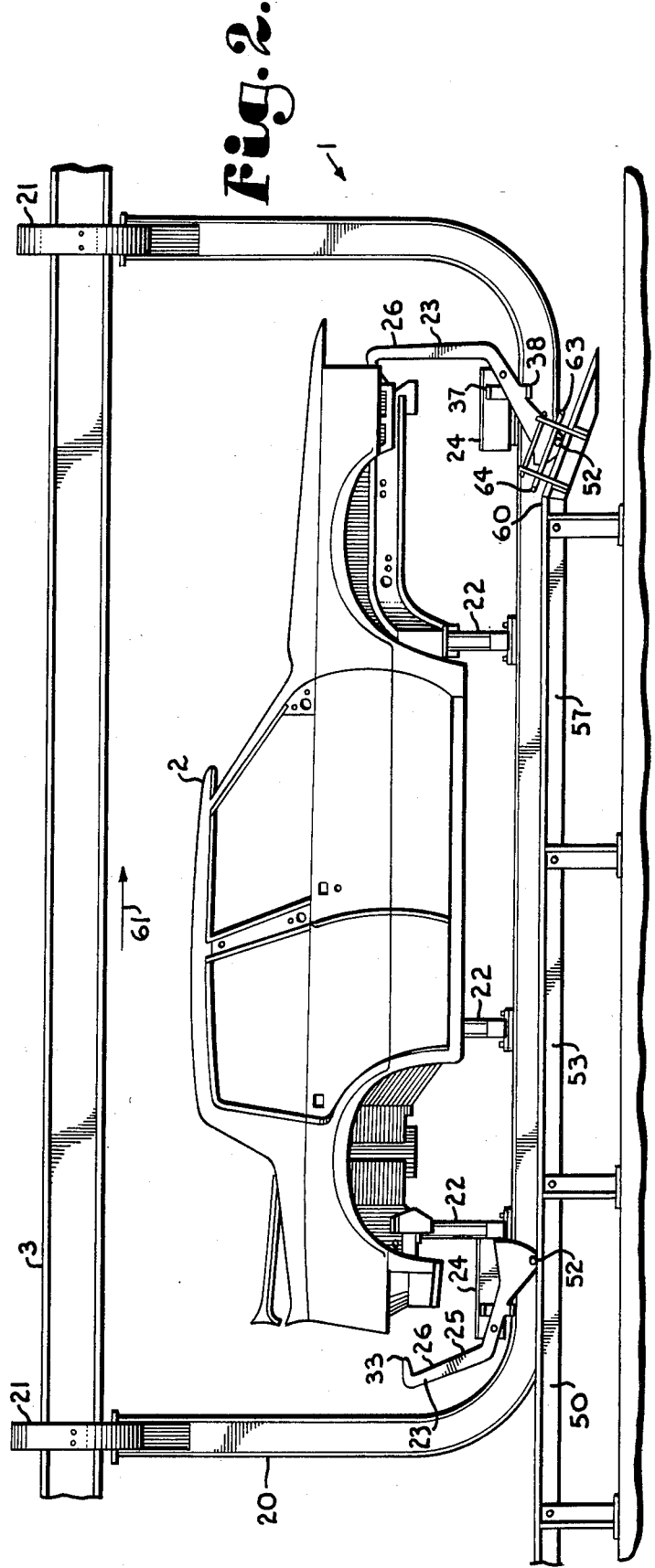

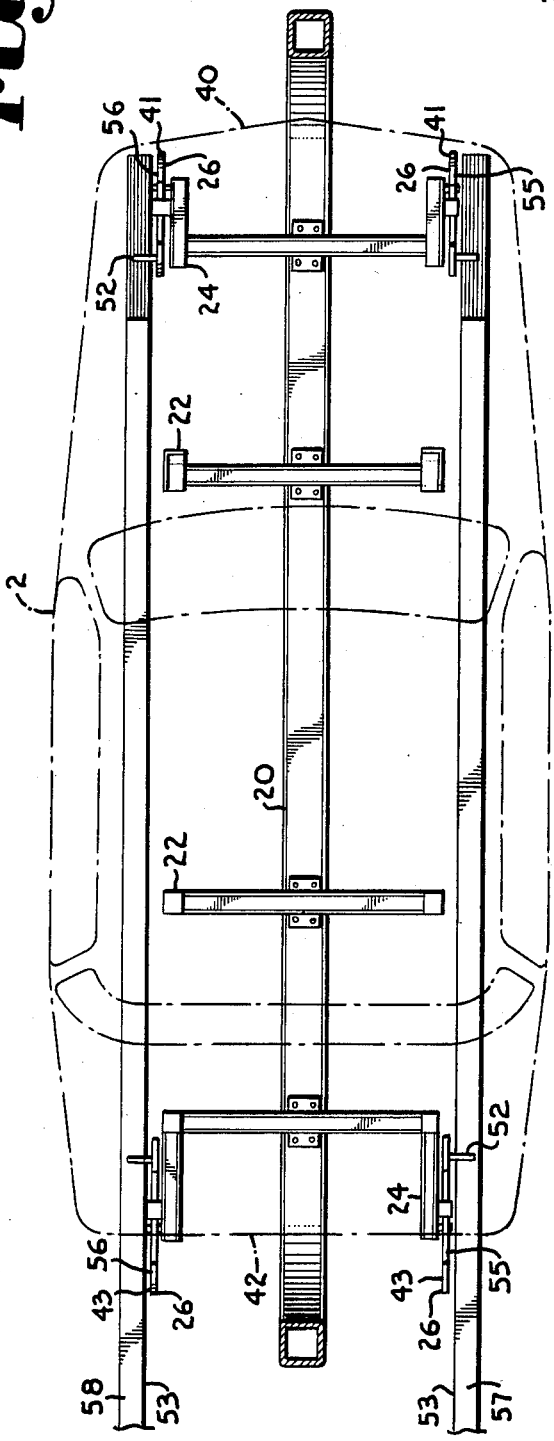
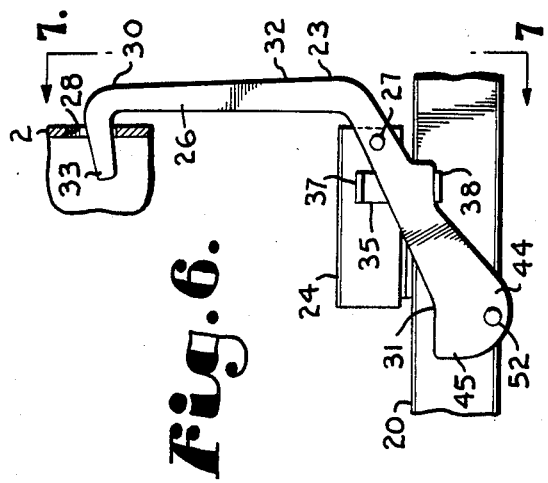
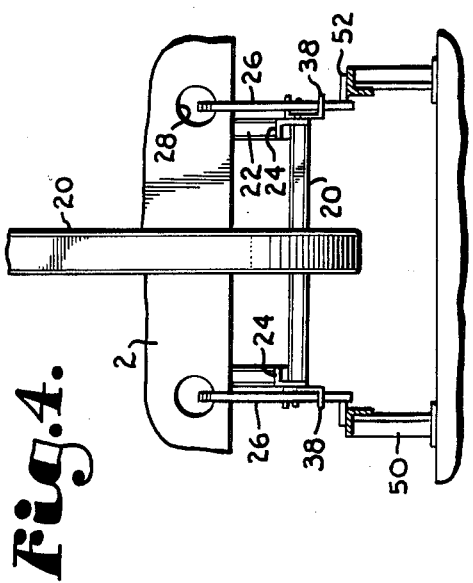

AUTOMATIC LATCHING ASSEMBLY FOR CAR BODY CARRIERS

BACKGROUND OF THE INVENTION

The present invention relates to conveyors, and in particular to a latching assembly for automatically securing an object to a conveyor assembly, and further for automatically releasing the object therefrom.

In the automobile industry, overhead conveyors are frequently utilized to transport a portion of a vehicle frame or body through an assembly plant. Generally, the vehicle frame rests upon a portion of a conveyor carrier, held thereon only by gravity.

In many assembly or maintenance plants, a step of dipping the vehicle body or frame into a treatment solution is involved. These treatment baths can have various purposes including cleaning or other treatment of the vehicle. During these treatment baths, the conveyor usually transports the vehicle body directly into the bath, entirely submerging it.

If the vehicle body is not secured to the conveyor carrier during this dipping process, problems can arise. Generally, as the vehicle body is being submerged air pockets therein may cause it to float and, if it is not adequately secured to the conveyor carrier, it may float away from the carrier and either be damaged, or significantly inhibit the conveyor system from operating smoothly.

Tie-down or anchoring systems for securing the vehicle body to the conveyor carrier, during the treatment bath, have been developed. Generally, they involve a complex latching system which must be manually operated to engage the vehicle and thus secure it to the conveyor carrier. Following treatment by dipping, these latching systems must again be manually operated to disengage the vehicle so that it will no longer be anchored to the carrier and can be removed therefrom.

The industry has generally lacked an automatic latching assembly which can be utilized to secure a vehicle body to a conveyor carrier, prior to dipping, and further, which automatically releases from engagement with the vehicle body, after the treatment bath. With such an assembly, selective latching and unlatching are accomplished at selected postions in the maintenance or assembly plant, without the expense of additional operators and with generally increased efficiency of operation. An important feature of such device or assembly is that it be relatively simple in construction so that it will remain relatively unaffected by the treatment baths and will be generally free from jamming during operation.

OBJECTS OF THE INVENTION

Therefore, the objects of the present invention are: to provide an assembly including an automatic latching device for securing an object to a conveyor carrier; to provide such an assembly specifically adapted for the securing of a vehicle frame or body to an overhead conveyor carrier; to provide such an assembly in which a plurality of latches are utilized to engage the vehicle body, at numerous points, for anchoring to the conveyor carrier; to provide such a device which is specifically adapted for anchoring the vehicle body to the conveyor carrier during dipping of the vehicle body into a treatment bath; to provide such an assembly in which tendency by the vehicle body to float, while being submerged in the treatment bath, will tend to more tightly secure the vehicle body to the conveyor assembly; to provide such an assembly in which the latches may be selectively and automatically operated, without manual assistance, to engage the vehicle body, thus securing it, and further, to disengage the vehicle body, thus releasing the engagement; to provide such an assembly in which the latches are specifically designed to be relatively free from effects of the treatment solution and from chances of jamming during operation; to provide such an assembly which is relatively inexpensive to produce; and to provide such an assembly which is easy to manufacture, simple to use, and which is particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

An automatic latching assembly is provided for engaging a vehicle body and securing same to a conveyor which is used to transport the vehicle body along a transport path into, and out of, a treatment bath. The assembly includes a conveyor carrier, or support rack, upon which the vehicle body is transported through an assembly or maintenance plant. A latch mechanism is mounted upon the conveyor carrier and includes latch means such as hooks which are pivotally mounted to selectively engage or disengage the vehicle body. When the hooks engage the vehicle body it is securely anchored to the conveyor carrier. Such engagement, or latching, is selectively accomplished prior to conveyance of the vehicle body into the treatment bath, so that the vehicle body will not float away from the carrier while being dipped.

Selective actuation of the latch mechanism is controlled by automatic latching means and latching means which require no manual manipulation for operation. The automatic latching and unlatching means include a latch actuator and an automatic unlatching actuator. The latch actuator selectively causes the latches or hooks to engage the vehicle body.

The latch actuator comprises, in part, a counterweight on the pivotally mounted hooks. The counterweight is selectively gravity actuated to cause pivoting of the hook, the pivoting resulting in engagement between the hook and a vehicle body.

As will be understood from the detailed description, if the counterweight is not permitted to fall, but rather is raised, the hooks will pivot away from the vehicle body for disengagement. This disengaging, or unlatching, is actuated by the automatic unlatching actuator. The particular unlatching actuator detailed below, for the preferred embodiment is a stationary unlatching mechanism which comprises a cam or rail which engages an extension mounted on the counterweight. The cam biases the counterweight upwardly, as selected, pivoting the hook and disengaging the latch mechanism from the vehicle.

It will be understood that the counterweight pivots the hook into latching engagement with the vehicle body prior to conveyance of the conveyor carrier, with the vehicle body thereon, into the treatment bath. It is readily seen that the counterweight generally causes and maintains the latching engagement; however, an initial urging or biasing may be desirable to cause the counterweight to begin to drop and to positively ensure a latching engagement. This biasing is automatically accomplished by the use of a second stationary cam or biasing means to push the counterweight downwardly and pivot the hooks toward engagement. It will be further understood that the cam or rail which lifts the counterweight, pivoting the hooks out of engagement with the vehicle body, generally engages the counterweight after the vehicle body has been given the treatment bath or immediately before a vehicle body is even placed on the carrier.

The assembly according to the present invention is essentially completely automatic in operation to generate latching or unlatching as desired, by selective placement of the various cam means throughout the plant or maintenance facility. Further, the embodiment described below is sufficiently simple to prevent undesired jamming during operation or undesired interaction with the treatment bath.

The drawings constitute a part of this specification and include exemplary embodiments of the present invention and illustrate various objects and features thereof.

BRIEF DESCRIPTION OF THE DRAWINGS

FIG. 1 is a fragmentary, side view of an assembly according to the present invention shown in a typical environment of operation in which a vehicle body is transported into and out of a treatment bath during multiple steps of use.

FIG. 2 is an enlarged side view of the assembly showing certain portions of the assembly engaging the vehicle for latching and certain other portions of the assembly in an unlatched orientation.

FIG. 3 is an enlarged, fragmentary top plan view of the assembly, with a vehicle frame mounted thereon shown in phantom lines.

FIG. 4 is an enlarged, fragmentary rear elevational view of the assembly with rear latches or hooks thereof maintained in a non-latching orientation.

FIG. 5 is an enlarged, fragmentary, side elevational view of a portion of the assembly with front latches or hooks shown in a non-latching orientation.

FIG. 6 is an enlarged, fragmentary, side elevational view of a portion of the assembly, generally analogous to FIG. 5 but showing the assembly in an orientation in which the vehicle body is latched to the assembly.

FIG. 7 is an enlarged, fragmentary, front elevational view of a portion of the assembly shown in FIG. 6, the view being generally from the orientation of line 7—7.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an automatic latching assembly according to the present invention. The latching assembly 1 is utilized to secure a vehicle body 2, FIG. 1, to a conveyor 3, while the vehicle body 2 is transported into and out of a treatment bath 4 in a vehicle assembly or maintenance plant.

FIG. 1 generally illustrates three stages of use of the assembly 1. In stage 1, reference numeral 10, the assembly 1 is shown beginning to secure the vehicle body 2 to the conveyor 3. In stage 2, reference numeral 11, the vehicle body 2 is shown having been completely submerged in a treatment bath 4. The assembly 1 is completely engaged and prevents the vehicle body 2 from floating out of engagement with the assembly 1, while being dipped. In stage 3 reference numeral 12, the vehicle body 2 has been conveyed out of the treatment bath 4 and the assembly 1 automatically disengages the vehicle body 2 so that it is no longer positively secured to the assembly 1, but rather merely rests thereon.

Referring to FIGS. 2 and 3, the assembly 1 includes a support rack or conveyor carrier 20 upon which the vehicle body 2 rests. The conveyor carrier 20 is mounted upon a conventional overhead conveyor 3 by a conventional overhead conveyor engagement mechanism 21. Conveyor carriers which transport vehicle bodies through maintenance and assembly plants by means of overhead conveyors are well-known, and it will be readily understood that a variety of conveyor carriers and overhead conveyors may be utilized with the present invention. Generally, the vehicle body 2 rests upon various supports 22 which are mounted upon the conveyor carrier 20 and which are appropriately positioned for the particular vehicle body to be conveyed.

The assembly 1 further includes a latch mechanism 23 which is selectively actuated to secure the vehicle body 2 to the conveyor carrier 20, so that the vehicle body 2 is positively held thereon, rather than being merely retained thereon by gravity. When the latch mechanism 23 is actuated to engage the vehicle body 2, the vehicle body 2 will be unlikely to become separated from the conveyor carrier 20 as it is conveyed into the treatment bath 4.

In the embodiment shown, the latch mechanism 21 is mounted on brackets 24, FIG. 7, and comprises four latches or hooks 26 pivotally mounted upon the conveyor carrier 20. Each hook 26 pivots between two extremes. In the first, FIG. 5, a hook 26 pivotally mounted on an axle 27 swings to an extreme position where it does not engage the vehicle body 2. In the second extreme, FIG. 6, the hook 26 pivots about the axle 27 so that it engages an aperture 28 in the vehicle body 2, thus latching the vehicle body 2 and securing it to the conveyor carrier 20. Referring to FIG. 3, four analogous hooks 26 are positioned about the approximate four corners of the vehicle body 2 so that the vehicle 2 may be securely mounted upon the conveyor carrier 20. It will be understood that the vehicle body 2 has appropriate apertures 28 corresponding to each of the four hook or latch locations. The axles 27, FIG. 7, may be of a conventional bolt and bushing design 29.

A primary advantage to the present invention is that the latch mechanism 23 is actuated by automatic latching means, so that human operators are not needed to manually engage or disengage the hooks 26 from the vehicle body 2. The structure and operation of the automatic latching means are detailed below, following a description of the latches or hooks 26.

Referring to FIG. 5, each hook 26 has a first end 30, a second end 31, and a central portion 32. A finger extension 33, mounted upon the first end 30, provides for engagement between the hook 26 and the aperture 28 in the vehicle body 2, FIG. 6. The axle 27, by which the hook 26 is mounted on the conveyor carrier 20, extends through a pivot point 34 in the central portion 32 of the hook 26. It is readily seen by reference to FIG. 5 and FIG. 6 that pivoting about the axle 27 moves the finger 33 into or out of engagement with the vehicle body 2, as it extends through aperture 28.

A set of stops 35, FIGS. 6 and 7, is mounted on the carrier 20 to control pivotal movement of the hooks 26. Each hook 26 has a set of stops 35 associated therewith. A stop upper extension 37 prevents the hook 26 from pivoting out of engagement with a vehicle body 2, any further than is desired, FIG. 5. A stop lower extension 38, FIGS. 6 and 7, prevents the hook 26 from pivoting toward the vehicle body 2 any more than is desired.

Referring to FIG. 3, the front 40 of the vehicle body 2 has two front hooks 41 associated therewith. These front hooks 41 comprise two of the four hooks 26 and are substantially mirror images of one another, with each having the features discussed above. Each is mounted on a bracket 24 analogous to that shown in FIG. 7. Further, the rear of the vehicle body 42, FIG. 3, has a pair of rear hooks 43 associated therewith, which are mirror images with respect to one another, and further each is substantially a mirror image of the front hook 41 that it is behind. Hooks 43 are also mounted upon brackets 24, FIG. 4, analogous to brackets 22 in FIG. 7.

As indicated above, the latch mechanism 23, comprising the latches or hooks 26, is automatically actuated by latching means. Latching is actuated by a latching means including an automatic latch actuator 44 comprising a counterweight 45 extending from the second end 31 of each hook 26, FIG. 6. Generally, the counterweight 45 is sufficiently heavy to cause rotation or pivoting of the hook 26 about the axle 27 until the hook 26 engages the stop lower extension 38, FIG. 6. In the preferred embodiment, gravity acting upon the counterweight 45 will be generally sufficient to both activate the rotation above described and maintain the hook 26 in the latching orientation, FIG. 6. Each hook 26 has a gravity actuator counterweight 45 thereon and, when each is gravity actuated, all latches or hooks 26 are engaged and the vehicle body 2 is securely latched to the carrier 20.

Referring to FIG. 1, in stage 2, reference numeral 11, the vehicle body 2 is shown completely submerged in the treatment bath 4 by the conveyor carrier 20. In this stage all of the hooks 26 are in the latching orientation, analogous to FIG. 6, and the vehicle body 2 is securely held upon the carrier 20. Any tendancy by the vehicle body 2 to float during submerging or complete submergence will tend to lift the vehicle body 2 into the finger extension 33 on each hook 26 and cause a tighter engagement between the vehicle body 2 and each hook 26, FIG. 6. Thus, the latch mechanism 23 tends to grip the vehicle body 2 more securely whenever the vehicle body 2 tends to float in the treatment bath 4.

It is readily understood that actuation of the automatic latch actuator 44 can be selectively prevented by appropriate prevention of rotation of the hooks 26 about the axles 27. This is readily accommodated by an unlatching means including a stationary automatic unlatching actuator 49 which comprises an upward cam actuator 50, FIG. 5, supporting the counterweights 45 and preventing them from lowering to rotate the hooks 26. The cam 50 is stationary with respect to movement of the carrier 20 and is appropriately positioned for engagement with the hooks 26. Referring to FIGS. 5 and 7, each counterweight 45 has a cam engaging extension or rod 52 mounted thereon and extending outwardly therefrom. For each hook 26, the associated rod 52 extends generally outwardly from a center of the carrier 20, however, other orientations may be utilized according to the present invention.

Whenever the rod 52 is supported by an upward cam 50, as shown in FIG. 5, tne counterweight 45 is prevented from lowering and the hook 6 is maintained in an unlatched orientation. In the present embodiment, the cam 50 comprises a track or pair of rails 53, FIG. 3, appropriately positioned underneath the conveyor 3 at selected locations where unlatching is desired. The four hooks 26 can be viewed as comprising a right linear pair 55 and a left linear pair 56, FIG. 3. The right pair 55 are generally simultaneously acted upon by a first rail 57 and the left pair 56 may be generally simultaneously acted upon by a second rail 58. When all four hooks 26 are simultaneously acted upon by rails 57 and 58, complete unlatching is accomplished and the vehicle body 2 rests upon the carrier 20 but is not positively secured thereto. Generally, this orientation is desired following dipping in the treatment bath 4, or, for an empty carrier 20, just prior to the placement of the vehicle body 2 thereon.

As the conveyor 3 transports the carrier 20 to a front end 60 of the rails 53, FIG. 2, the rods 52, as they pass off the end 60 of the rails 53, are no longer supported and the counterweight 45 may generate the locking rotation. The direction of conveyance will be understood to be generally along the direction of arrow 61 in FIGS. 1 and 2.

Referring to FIGS. 2 and 5, rotation of the hook 26 into locking orientation is positively assured by the use of a cam 63 mounted just beyond the end 60 of the rail 53. The downward actuating cam 63 includes an arm 64, which rod 52 will engage as it leaves the end 60 of the rail 53, FIG. 2. The arm 64 biases the rod 52 and counterweight 45 downwardly, pivoting the hook 26 into the latching orientation of FIG. 6. Each of the rails 57 and 58 may have a downwardly biasing cam 63 associated therewith. The front hooks 41 will be first to engage the cam 63 as the conveyor 3 transports the conveyor carrier 20, however, eventually the rear hooks 43 will reach the downward biasing cam 63 and be positively urged thereby into the latching orientation and all four hooks 26 will be latched, FIG. 1.

If the hooks 26 are in the latching orientation, FIG. 6, and unlatching is desired, as for example following submergence in the treatment bath 4, a upward cam extension 68, FIG. 1, is utilized. The upward cam extension 68 comprises a ramp 69 which is engaged by the extension rod 52, as the carrier 20 is transported. The ramp 69 terminates at the beginning 70 of the rails 53. Each rail 57 and 58 has a ramp 69 associated therewith.

Operation of the assembly 1 is generally fully understood by reference to FIG. 1. In the first stage, reference numeral 10, the vehicle body 2 is shown resting upon the carrier 20. The conveyor 3 is shown just beginning to transport the vehicle body 2 beyond the ends 60 of the rails 53 as the vehicle body 2 is conveyed toward the treatment solution 4. The front hooks 41 are shown engaging the vehicle body 2 since they have been conveyed beyond support by the rails 53. The rear hooks 43, however, are shown unlatched as they remain supported by the rails 53, FIG. 4.

In the second stage, reference numeral 11, no rail 53 is present and all four hooks 26 are in the latching orientation. The vehicle body 2, completely submerged in a treatment bath 4, is securely held upon the conveyor carrier 20.

In stage 3, reference numeral 12, the conveyor 3 has conveyed the carrier 20, and vehicle body 2, out of the treatment bath and over side rails 53. As the hooks 26 engaged the ramps 68 unlatching occurred; and, the vehicle body 2 was released from the latching mechanism 23. At this stage the vehicle body 2 is only held upon the conveyor carrier 20 by gravity.

FIG. 2 shows an enlarged view of stage 1, reference 10, illustrating the conveyor carrier 20 and the vehicle body 2 as they are moved by the conveyor 3 off the end 60 of the rails 53.

Rails 53 having ramps 69, and downward biasing cams 63, associated therewith may be mounted at numerous appropriate locations along a path of conveyance. Whenever the rails 53 are not present, the counterweights 45, if sufficiently heavy, will rotate the hooks 26 into the latching orientation. However, if sufficiently light counterweights 45 are utilized, then a locking orientation will generally only be achieved when the downwardly biasing cam 63 has been given an opportunity to act upon the hooks 26, through engagement with the rods 52.

The four hooks 26 are organized into front pairs and rear pairs which are mirror images of one another and left pairs and right pairs which are mirror images of one another, but each hook 26 is otherwise identical. It is foreseen that a variety of latch or hook designs may be utilized with the present invention.

It is to be understood that while certain forms of the present invention have been illustrated and described herein, it is not to be limited to the specific forms or arrangement of parts described and shown.

What is claimed and desired to be secured by Letters Patent is as follows:

1. An automatic latching assembly for engaging a vehicle body and securing same to a conveyor used to transport said vehicle body into, and out of, a treatment bath; said automatic latching assembly comprising:
   (a) a carrier upon which said vehicle body rests during said transport;
   (b) a latch mechanism mounted on said carrier; said latch mechanism including hook means mounted on said carrier to selectively engage said body whenever actuated;
      (i) said hook means including a plurality of hooks, each having a generally extended, curved structure with a first end, a second end, and a central portion; each hook central portion having a pivot point thereon by which said hook is pivotally mounted on said carrier; each hook first end having a finger thereon, each of said fingers being oriented to engage a vehicle body on said carrier, when said hooks are pivoted to first, latching, orientations; said fingers each disengaging said vehicle when said hooks are pivoted into second, unlatching, orientations;
   (c) latching means associated with said latch mechanism; said latching means including a latch actuator for selectively actuating said latch mechanism to secure said vehicle body to said carrier;
      (i) said latch actuator including a counterweight mounted on each hook second end; said counterweights generally urging pivoting of said hooks to said first orientations, and retaining said hooks therein, by action of gravity on said counterweights, unless prevented by said latching assembly;
   (d) unlatching means including an unlatching actuator for selectively actuating said latch mechanism to disengage said vehicle body;
      (i) said unlatching actuator including stationary upward cam means selectively urging said hooks into said second orientations, preventing said counterweights from actuating pivoting of said hooks, and thereby selectively maintaining unlatching of said vehicle body from said assembly; and
   (e) a cam engaging extension mounted on each of said hook second ends, and extending outwardly therefrom;
      (i) said upward cam means comprising a stationary rail track oriented to engage said cam engaging extensions and bias same upwardly to urge said hooks into said second orientations;
      (ii) said rail track being positioned at a selected location along a path of conveyance of said vehicle body and carrier, where unlatching is intended; the absence of said rail track, along a portion of said path, generally allowing said counterweights to urge pivoting of said hooks into said first orientations;
   (f) whereby a vehicle body to be conveyed, and treated by dipping, is selectively latched to said carrier, to prevent disengagement therefrom during dipping; and, whereby said latch mechanism may be selectively disengaged following said dipping.

2. An automatic latching assembly according to claim 1 wherein:
   (a) said rail track has a first, upstream, end and a second, downstream, end; said second end having a downward cam mechanism associated therewith;
      (i) said downward cam mechanism selectively engaging said cam engaging extensions, during said transport of said carrier by said conveyor, and biasing same to selectively initiate actuation of pivoting of said hooks toward said first orientations, as said hooks leave engagement with said rail track.

3. An automatic latching assembly for engaging a vehicle body and securing same to a conveyor used to transport said vehicle body into, and out of, a treatment bath; said automatic latching assembly comprising:
   (a) a carrier upon which said vehicle body rests during said transport;
   (b) a latch mechanism mounted on said carrier; said latch mechanism including hook means mounted on said carrier to selectively engage said vehicle body whenever actuated;
      (i) said hook means including a plurality of hooks, each having a generally extended, curved structure with a first end, a second end, and a central portion having a pivot point thereon by which said hook is pivotally mounted on said carrier; each hook first end having a finger thereon; each of said fingers being oriented to engage a vehicle body on said carrier, when said hooks are pivoted to first, latching, orientations; said fingers each disengaging said vehicle when said hooks are pivoted into second, unlatching, orientations;
   (c) latching means associated with said latch mechanism; said latching means including a latch actuator for selectively actuating said latch mechanism to secure said vehicle body to said carrier;
  (i) said latch actuator including a counterweight mounted on each hook second end; said counterweights generally urging pivoting of said hooks to said first orientations, and retaining said hooks therein, by action of gravity on said counterweights, unless prevented by said latching assembly;
(d) unlatching means including an unlatching actuator for selectively actuating said latch mechanism to engage said vehicle body by biasing said hooks into said second orientations;
(e) a cam engaging extension mounted on each of said hook second ends, and extending outwardly therefrom;
(f) a downward cam machanism selectively engaging said cam engaging extension, during said transport of said carrier by said conveyor, and selectively biasing same to initiate actuation of pivoting of said hooks toward said first orientations;
  (i) said downward cam mechanism comprising downward cam means selectively positioned along a path of conveyance of said vehicle body and carrier, where latching is intended and said unlatching actuator is selectively disengaged;
(g) whereby a vehicle body to be conveyed, and treated by dipping, is selectively latched to said carrier, to prevent disengagement therefrom during dipping; and, whereby said latch mechanism may be selectively disengaged following said dipping.

4. An automatic latching assembly for engaging a vehicle body and securing same to a conveyor used to transport said vehicle body into, and out of, a treatment bath; said automatic latching assembly comprising:
(a) a carrier upon which said vehicle body rests during said transport;
(b) a latch mechanism mounted on said carrier; said latch mechanism including hook means mounted on said carrier to selectively engage said body whenever actuated;
  (i) said hook means including a plurality of hooks, each having a pivot point thereon by which said hook is pivotally mounted on said carrier; each hook being oriented to engage a vehicle body on said carrier, when said hooks are pivoted to first, latching, orientations; each of said hooks disengaging said vehicle when pivoted into second, unlatching, orientations;
(c) latching means associated with said latch mechanism; said latching means including a latch actuator for selectively actuating said latch mechanism to secure said vehicle body to said carrier;
  (i) said latch actuator including a counterweight mounted on each hook, said counterweights oriented to urge pivoting of said hooks to said first orientations, and retaining said hooks therein, by action of gravity on said counterweights, unless prevented by said latching assembly;
(d) unlatching means including an unlatching actuator for selectively actuating said latch mechanism to disengage said vehicle body;
  (i) said unlatching actuator including stationary upward cam means selectively urging said hooks into said second orientations, preventing said counterweights from actuating pivoting of said hooks, and thereby selectively maintaining unlatching of said vehicle body from said assembly; and
(e) cam engaging means mounted on each of said hooks;
  (i) said upward cam means comprising a stationary rail track oriented to engage said cam engaging means and bias same upwardly to pivot said hooks into said second orientations;
  (ii) said rail track being positioned at a selected location along a path of conveyance of said vehicle body and carrier, where unlatching is intended; the absence of said rail track, along a portion of said path, generally allowing said counterweights to urge pivoting of said hooks into said first orientations;
(f) whereby a vehicle body to be conveyed, and treated by dipping, is selectively latched to said carrier, to prevent disengagement therefrom during dipping; and, whereby said latch mechanism may be selectively disengaged following said dipping.

5. An automatic latching assembly according to claim 4 wherein:
(a) said cam engaging means comprises a cam engaging extension mounted on each of said hooks; and
(b) said rail track has a first, upstream, end and a second, downstream, end; said second, downstream, end having a downward cam mechanism associated therewith;
  (i) said downward cam mechanism selectively engaging said cam engaging extension, during said transport of said carrier by said conveyor, and biasing same to selectively initiate lowering of said counterweights and pivoting of said hooks toward said first orientations, as said hooks leave engagement with said rail track.

6. An automatic latching assembly for engaging a vehicle body and securing same to a conveyor used to transport said vehicle into, and out of, a treatment bath; said automatic latching assembly comprising:
(a) a carrier upon which said vehicle body rests during said transport;
(b) a latch mechanism mounted on said carrier; said latch mechanism including hook means mounted on said carrier to selectively engage said body whenever actuated;
  (i) said hook means including a plurality of hooks, each hook having a central pivot point thereon by which said hook is pivotally mounted on said carrier; each hook being oriented to engage and secure a vehicle body on said carrier, when said hooks are pivoted to first, latching, orientations; said hooks each disengaging said vehicle when pivoted into second, unlatching, orientations;
(c) latching means associated with said latch mechanism; said latching means including a latch actuator for selectively actuating said latch mechanism to secure said vehicle body to said carrier;
  (i) said latch actuator including pivoting means for selectively pivoting said hooks into said first orientations, to cause said vehicle body to become secured to said carrier;
(d) unlatching means including an unlatching actuator for selectively actuating said latch mechanism to disengage said vehicle body;
  (i) said unlatching actuator including stationary unlatching cam means selectively urging said hooks into said second orientations and thereby selectively maintaining unlatching of said vehicle body from said assembly; and (e) a cam engaging extension mounted on each of said hooks and extending outwardly therefrom;
- (i) said unlatching cam means comprising a stationary rail track oriented to engage said cam engaging extensions and bias same to pivot said hooks into said second orientations;
- (ii) said rail track being positioned at a selected location along a path of conveyance of said vehicle body and carrier, where unlatching is intended;
- (iii) said latch actuator pivoting means orienting said hooks in said first, latching, orientations unless prevented by said rail track;

(f) whereby a vehicle body to be conveyed, and treated by dipping, is selectively latched to said carrier, to prevent disengagement therefrom during dipping; and whereby said latch mechanism may be selectively disengaged following said dipping.

7. An automatic latching assembly according to claim 6 wherein:

(a) said unlatching cam means rail track has a first, upstream, end and a second, downstream, end; said second end having a latching cam mechanism associated therewith;
- (i) said latching cam mechanism selectively engaging said cam engaging extensions, during said transport of said carrier by said conveyor, and initiating biasing of same, by said latching actuator, to pivot said hooks toward said first orientations, as said hooks leave engagement with said unlatching cam means.

* * * * *